United States Patent [19]

Jung

[11] Patent Number: 5,510,856
[45] Date of Patent: Apr. 23, 1996

[54] APPARATUS FOR DETERMINING MOTION VECTORS

[75] Inventor: Hae-Mook Jung, Seoul, Rep. of Korea

[73] Assignee: Daewoo Electronics Co., Ltd., Seoul, Rep. of Korea

[21] Appl. No.: 367,529

[22] Filed: Dec. 30, 1994

[51] Int. Cl.⁶ .................................................. H04N 7/28
[52] U.S. Cl. ...................... 348/699; 348/409; 348/416; 348/411
[58] Field of Search .................................. 348/416, 699, 348/700, 415, 412, 409, 411

[56] References Cited

U.S. PATENT DOCUMENTS

| | | | |
|---|---|---|---|
| 5,027,203 | 6/1991 | Samad et al. | 348/699 |
| 5,157,732 | 10/1992 | Ishii et al. | 348/699 |
| 5,189,518 | 2/1993 | Nishida | 348/700 |
| 5,210,605 | 5/1993 | Zaccarin et al. | 348/700 |
| 5,347,312 | 9/1994 | Saunders et al. | 348/699 |
| 5,387,947 | 2/1995 | Shin | 348/699 |
| 5,398,068 | 3/1995 | Liu et al. | 348/699 |

FOREIGN PATENT DOCUMENTS

| | | |
|---|---|---|
| 0180446 | 5/1986 | European Pat. Off. . |
| 0466981 | 1/1992 | European Pat. Off. . |
| 0511778 | 11/1992 | European Pat. Off. . |
| 0577165 | 1/1994 | European Pat. Off. . |
| 05176314 | 10/1993 | Japan . |

Primary Examiner—Tommy P. Chin
Assistant Examiner—Anand Rao
Attorney, Agent, or Firm—Anderson Kill Olick & Oshinsky

[57] ABSTRACT

An apparatus for determining motion vector for pixels of a current frame which includes a number of processing blocks comprises a motion estimator for providing motion vectors for the pixels in the current frame, a median filter for providing filtered motion vectors of the pixels, a majority detector for obtaining a first and a second major vectors corresponding to the pixels of a processing block, a controller for generating a control signal, a vector selection block for providing an output motion vector from the first and second major vectors which yields a motion compensated processing block having a less error function, and a switch responsive to the control signal for selecting a motion vector for each processing block from the output motion vector and a motion vector of the pixel located at the center of each processing block.

2 Claims, 3 Drawing Sheets

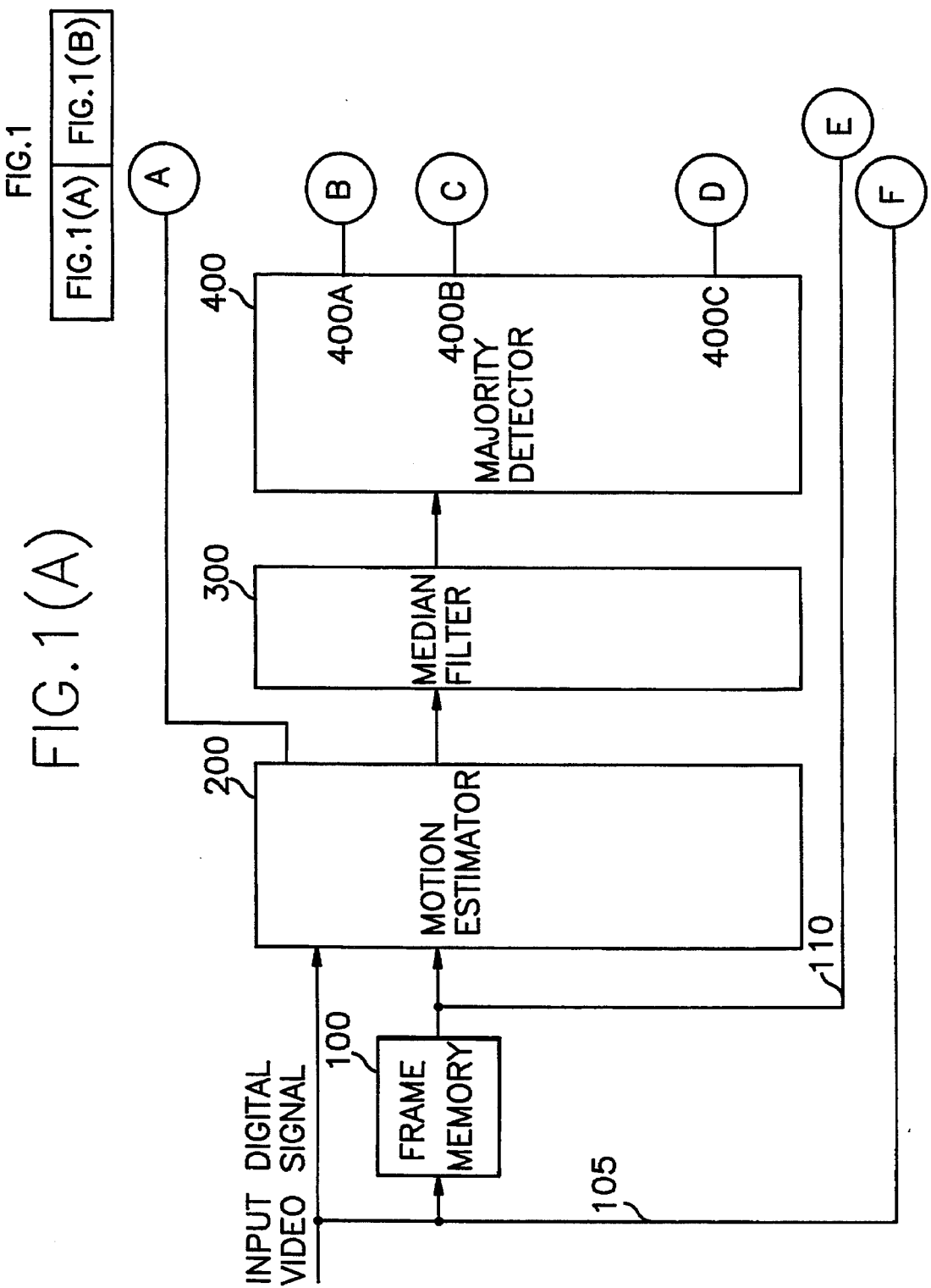

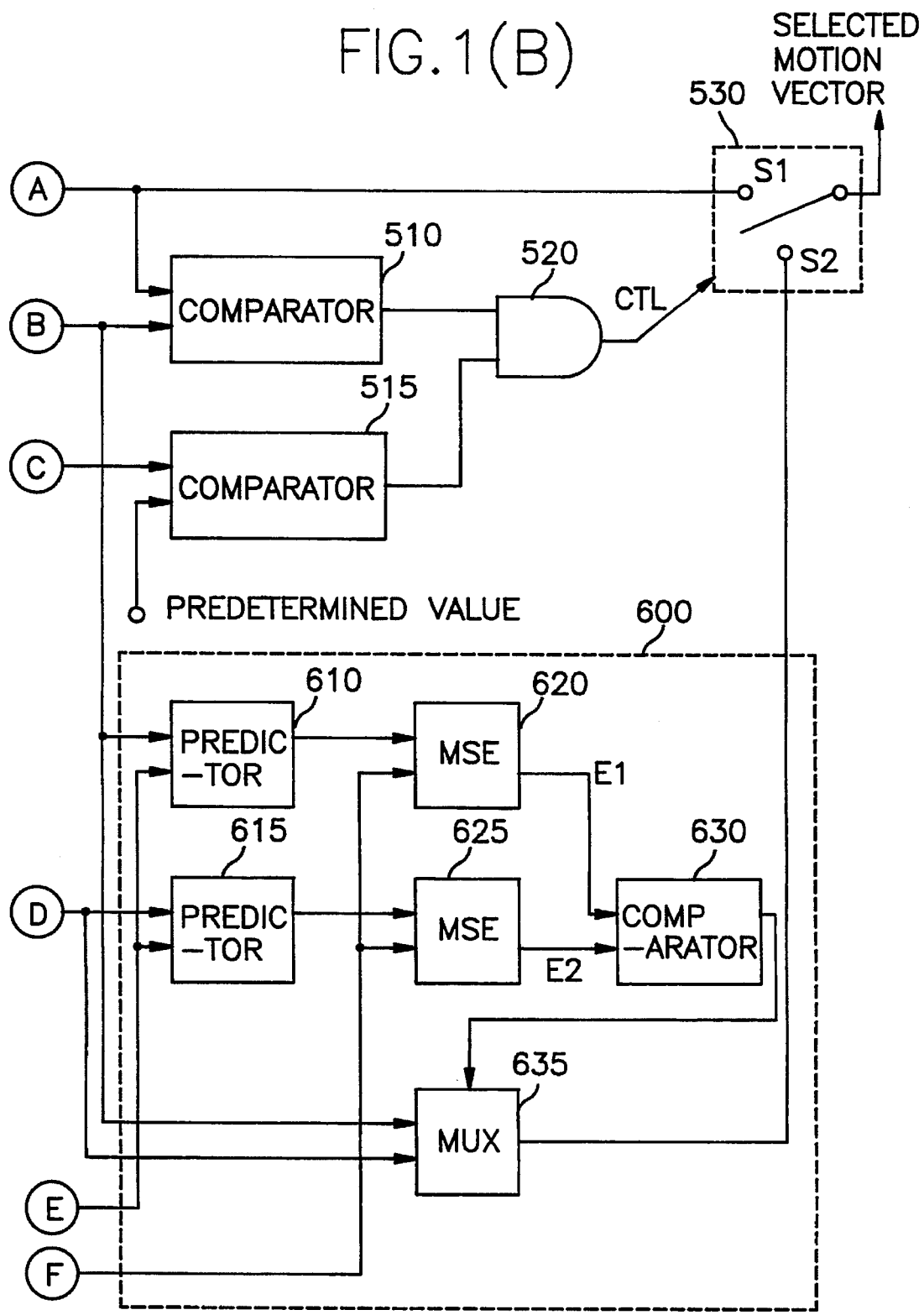

APPARATUS FOR DETERMINING MOTION VECTORS

FIELD OF THE INVENTION

The present invention relates to an improved apparatus for determining motion vectors; and, more particularly, to an improved apparatus for determining motion vectors by employing a median filtering technique.

DESCRIPTION OF THE PRIOR ART

In various electronic/electrical applications such as high definition television and video telephone systems, an image signal may need be transmitted in a digitized form. When the image signal is expressed in a digitized form, there is bound to occur a substantial amount of digital data. Since, however, the available frequency bandwidth of a conventional transmission channel is limited, in order to transmit the image signal therethrough, it is inevitable to compress or reduce the volume of the transmission data. Among various video compression techniques, a motion compensated interframe coding technique, which utilizes temporal redundancies of the video signals between two adjacent video frames for the compression of the signals, is known to be one of the effective compression techniques.

In the motion compensated interframe coding scheme, current frame data is predicted from previous frame data based on an estimation of a motion between the current and the previous frames. Such estimated motion may be described in terms of two dimensional motion vectors representing the displacement of pixels between the previous and the current frames. One of the motion vector estimation schemes which have been proposed in the art is a block matching algorithm (see, e.g., J. R. Jain et al., "Displacement Measurement and Its Application in Interframe Image Coding", *IEEE Transactions on Communications COM*-29, No. 12 (December 1981)).

According to the block matching algorithm, a current frame is divided into a plurality of equal-sized search blocks. The size of a search block typically ranges between 8×8 and 32×32 pixels. To determine a motion vector for a search block in the current frame, a similarity calculation is performed between the search block of the current frame and each of a multiplicity of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a best matching block, i.e., a candidate block which yields a minimum "error" or difference.

In this motion estimation, it would be desirable or convenient to find out only one minimum mean absolute error over the entire search region corresponding to the search block. Sometimes, however, there may be a plurality of equivalent minimum differences found during the block matching. In this case, the MPEG (Moving Pictures Expert Group) has suggested that all of the other equivalent minimum differences, except the minimum difference that has the highest priority among them, i.e., the one found first, are dropped out although this is not a matter of standardization. As a result, it is difficult to correctly detect a motion vector, with such a scheme, between the search block and the corresponding search region.

SUMMARY OF THE INVENTION

It is, therefore, a primary object of the present invention to provide an improved apparatus for determining motion vectors by employing a median filtering technique.

In accordance with the present invention, there is provided an apparatus, for use in a motion-compensated video signal encoder, for determining motion vectors representing a displacement between a current frame and a reference frame of video signals, wherein the current frame is divided into a plurality of processing blocks, each processing block having P×Q pixels with P and Q being integers larger than two and said P×Q pixels include therein an object pixel, the object pixel representing a pixel located at the center of each processing block, which comprises: means for providing a motion vector for each of the pixels included in the current frame, the motion vectors including object motion vectors, each of the object motion vectors being a motion vector for each of the object pixels; means for median-filtering the motion vectors to generate filtered motion vectors for the pixels included in the current frame means for counting the number of filtered motion vectors having a same value among the filtered motion vectors corresponding to the pixels included in each processing block, thereby sorting out first and second major vectors, the first and the second major vectors representing the filtered motion vectors having the largest and the second largest counted numbers, respectively, for said each processing block; means for calculating error functions for said each processing block based on the first and second major vectors to thereby select as an output motion vector one of the first and second major vectors which yields a minimum error function; means for generating a control signal based on the object motion vector, the first major vector and the counted number of the first major vector for said each processing block; and switching means, responsive to the control signal, for selecting one of the output motion vector and the object motion vector as the motion vector for said each processing block.

BRIEF DESCRIPTION OF THE DRAWINGS

The above and other objects and features of the present invention will become apparent from the following description of a preferred embodiment given in conjunction with the accompanying drawings, in which:

FIG. 1 and FIGS. 1(A) and (B) depict a block diagram of an inventive apparatus for determining motion vectors between a current frame and a reference frame of video signals.

DETAILED DESCRIPTION OF THE PREFERRED EMBODIMENTS

Figure 2:
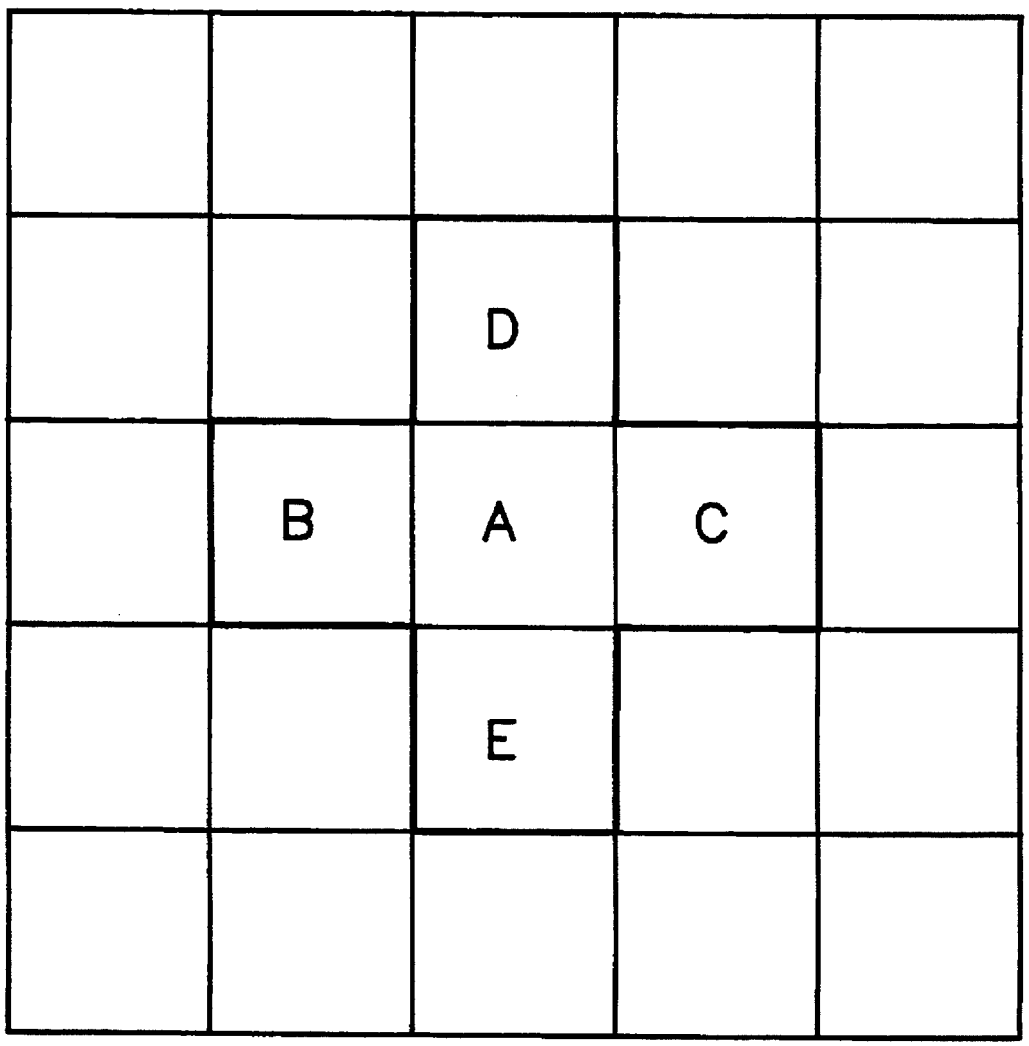
FIG. 2 illustrates a filtering window for the median filtering of pixels in accordance with the invention.

Referring to FIG. 1, there is shown a block diagram of an inventive apparatus for determining a motion vector for each of a plurality of processing blocks included in the current frame, each of the processing blocks having P×Q, e.g., 5×5, pixels.

Current frame data is fed as an input digital video signal to a frame memory 100 and a motion vector estimator 200. The reference frame data provided from the frame memory 100 is also fed to the motion estimator 200.

The motion estimator 200 serves to determine a motion vector for each of the pixels contained in the current frame by using a block matching algorithm. Specifically, in order to determine a motion vector for a pixel("target pixel") included in the current frame, a search block of M×N, e.g., 3×3 pixels is set up by using the target pixel as a reference, the target pixel coinciding with the center of the search block. The search block is compared with all of the candidate blocks included in the corresponding search region in the reference frame, on a block-by-block basis, by using the block matching algorithm well known in the art. A displacement for the search block obtained through the use of the block matching algorithm is assigned as a motion vector of the target pixel. Each of the motion vectors corresponding to each pixel included in the current frame is provided from the motion estimator 200 to a median filter 300 for further processing. The motion estimator 200 also provides motion vectors of object pixels to a comparator 510 in accordance with the invention, each of the object pixels being a pixel positioned at the center of each processing block if both Q and P are odd numbered integers; one of two pixels at the center thereof if either Q or P is an even numbered integer; and one of four pixels at the center thereof if both Q and P are even numbered integers. That is, the object pixel is one of maximum four pixels located at the center of the processing block.

At the median filter 300, the median filtering operation is performed on each of the motion vectors fed from the motion estimator 200 through the use of an appropriate filtering window. In a preferred embodiment of the present invention, the median filter 300 has a cross-shaped filtering window as shown in FIG. 2, wherein the median filter 300 averages the motion vectors for the pixels A to E, which are included in the cross-shaped filtering window, by multiplying predetermined filter coefficients thereto; and assigns the averaged value as a filtered motion vector of the pixel A. Each of the filtered motion vectors corresponding to each of the pixels included in each processing block of the current frame is provided from the median filter 300 to a majority detector 400.

The majority detector 400, which receives a filtered motion vector corresponding to each of the pixels included in each processing block of, e.g., 5×5 pixels, counts the number of filtered motion vectors having a same value and determines a first and a second major vectors, the first and second major vectors corresponding to the filtered motion vectors having a first and a second largest counted numbers, respectively. The first and second major vectors are outputted through output terminals 400A and 400C of the majority detector 400, respectively. Also, the majority detector 400 outputs the number of the first major vector through its output terminal 400B.

A comparator 515 compares the number of the first major vector from the majority detector 400 with a predetermined value, e.g., 13; and generates a logic high signal to an AND gate 520 if the number of the first major vector is not smaller than 13; otherwise, it generates a logic low signal to the AND gate 520. The comparator 510 compares the first major vector provided from the output terminal 400A with the motion vector of the object pixel fed from the motion estimator 200 and produces a logic high signal to the AND gate 520 if they are identical; otherwise it produces a logic low signal.

In response to the output signals from the comparators 510 and 515, the AND gate 520 generates, as a control signal CTL to a terminal S1 of a switch 530, a logic high signal if both of the output signals from the comparators 510 and 515 are logic high and a logic low signal if otherwise.

In accordance with the present invention, the inventive apparatus further includes a vector selection block 600 for selecting among the first and second major vectors a major vector which generates a motion-compensated processing block having a less error function, e.g., mean square error. The vector selection block 600 comprises predictors 610 and 615 and mean square error (MSE) detectors 620 and 625.

Specifically, as shown in FIG. 1, the first and second major vectors are provided from the majority detector 400 to the predictors 610 and 615, respectively. In response to each major vector, each of the predictors 610 and 615 extracts the prediction data for the processing block, i.e., pixel data of the reference frame corresponding the first and second major vectors from the frame memory via line 110, and provides the extracted pixel data to the MSE detectors 620 and 625, respectively. The MSE detectors 620 and 625 calculate mean square errors between the two inputs, i.e., the processing block data of the current frame provided via line 105 and corresponding prediction data; and provides the calculated values, i.e., mean square errors, E1 and E2 to a comparator 630, respectively.

The comparator 630 compares two input values, i.e., E1 and E2, and generates a selection signal to a multiplexer (MUX) 635 having two input terminals coupled to the output terminals 400A and 400C of the majority detector 400. When E2 is not less than E1, the comparator 630 generates, e.g., a logic high selection signal to the MUX 635, thereby providing the first major vector to a terminal S2 of the switch 530 through line 605; otherwise, it generates a logic low selection signal to the MUX 635, thereby providing the second major vector to the terminal S2.

The switch 530 selects one of the two input signals fed to the two terminals S1 and S2 in response to the control signal CTL. In other words, the switch 530 selects, as a motion vector of the processing block, the input to the terminal S1, i.e., the motion vector of the object pixel if the control signal CTL is logic high; and the input to the terminal S2, i.e., the major vector which yields a less mean square error if the control signal CTL is logic low. While the present invention has been described with respect to certain preferred embodiment only, other modifications and variations may be made without departing from the spirit and scope of the present invention as set forth in the following claims.

What is claimed is:

1. An apparatus, for use in a motion-compensated video signal encoder, for determining motion vectors representing a displacement between a current frame and a reference frame of video signals, wherein the current frame is divided into a plurality of processing blocks, each processing block having P×Q pixels with P and Q being integers larger than two and said P×Q pixels include therein an object pixel, the object pixel representing a pixel located at the center of each processing block, which comprises:

means for providing a motion vector for each of the pixels included in the current frame, the motion vectors including object motion vectors, each of the object motion vectors being a motion vector for each of the object pixels;

median filter for filtering the motion vectors to generate filtered motion vectors for the pixels included in the current frame, said median filter having a cross-shaped filtering window for averaging the motion vectors therein;

means for counting a number of filtered motion vectors having a same value among the filtered motion vectors corresponding to the pixels included in each processing block, thereby sorting out first and second major vectors, the first and the second major vectors representing the filtered motion vectors having the largest and the second largest counted numbers, respectively, for said each processing block;

means for calculating error functions for said each processing block based on the first and second major vectors to thereby select as an output motion vector one of the first and second major vectors which yields a smaller error function;

means for generating a control signal based on the object motion vector, the first major vector and the counted number of the first major vector for said each processing block; and switching means, responsive to the control signal, for selecting one of the output motion vector and the object motion vector as the motion vector for said each processing block.

2. The apparatus according to claim 1, wherein said control signal generating means includes:

means, responsive to the object motion vector and the first major vector, for generating a first control signal if the object motion vector and the first major vector are identical each other, and a second control signal if otherwise; and means for comparing the counted number of the first major vector with a predetermined number to thereby generate a third control signal if the counted number of the first major vector is not smaller than the predetermined number, and a fourth control signal if otherwise, and wherein said switching means includes:

means, in response to the first, the second, the third and the fourth control signals, for generating a first selection signal if the first and third control signals are applicable, and a second selection signal if otherwise; and means, for selecting, as the motion vector for each processing block, the object motion vector in response to the first selection signal, and the output motion vector in response to the second selection signal.

* * * * *